United States Patent
Liu et al.

(10) Patent No.: US 6,647,533 B1
(45) Date of Patent: Nov. 11, 2003

(54) INCREMENTAL ALGORITHMS FOR OPTIMAL LINEBREAKING IN TEXT LAYOUT

(75) Inventors: Yanhong Annie Liu, Bloomington, IN (US); Toshiro Wakayama, Yamato-machi (JP)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/426,277

(22) Filed: Oct. 25, 1999

(51) Int. Cl.$^7$ .............................................. G06F 17/00
(52) U.S. Cl. ........................ 715/517; 715/521; 715/531
(58) Field of Search ................................ 715/517, 518, 715/519, 521, 523, 524, 530, 531

(56) References Cited

U.S. PATENT DOCUMENTS

| | | | | |
|---|---|---|---|---|
| 4,587,631 A | * | 5/1986 | Nielsen et al. | 715/524 |
| 5,625,773 A | * | 4/1997 | Bespalko et al. | 345/467 |
| 6,223,191 B1 | * | 4/2001 | Truelson | 715/517 |
| 6,510,441 B1 | * | 1/2003 | Kenninga | 715/521 |

OTHER PUBLICATIONS

James O. Achuegbue, "On the Line Breaking Problem in Text Formatting," Proceedings of the ACM SIGPLAN SIGOA Symposium on Text Manipulation, pp. 117–122 (1981).*

Michael Held et al., "A Dynamic Programming Approach to Sequencing Problems," Proceedings of the 1961 16th ACM National Meeting, pp. 71.201–71.204.*

Hanan Samet, "Heuristic for the Line Division Problem in Computer Justified Text," Communications of the ACM, Col. 25, Issue 8 (Aug. 1982), pp. 564–571.*

D. E. Knuth et al., "Breaking Paragraphs into Lines," Software—Practice and Experience, vol. 11, pp. 1119–1184 (1981).

* cited by examiner

Primary Examiner—Joseph H. Feild
Assistant Examiner—Charles A. Bieneman
(74) Attorney, Agent, or Firm—Fay, Sharpe, Fagan, Minnich & McKee, LLP

(57) ABSTRACT

A computer-implemented incremental algorithm for updating globally optimized linebreaks for a paragraph following a change to that paragraph takes advantage of the fact that in many cases, the effect of a change on a paragraph is of only limited extent in the paragraph. As a result, in many cases, previously evaluated information concerning feasible breakpoints for the original paragraph can be used to obtain the optimal break for the changed paragraph. The computer-implemented incremental algorithm models the paragraph as an acyclic graph and identifies those portions of the graph that are unchanged as a result of the revision. The method then evaluates feasible breakpoints and combined these with feasible breakpoints obtained from the original paragraph. Using these breakpoints, the incremental algorithm uses dynamic programming to obtain the optimal break for the changed paragraph.

51 Claims, 13 Drawing Sheets

```
  ╱56
 ╱ActiveNodeList := [b₀];
  b₀.dist := 0;
 ╱for b := b₁ to bₘ do
  ╲58  ╱b.fathers := 0;
    60  ⎧ for each active breakpoint bᵢ in ActiveNodeList do
        ⎪    ╱─Compute the adjustment ratio γ(<bᵢ,b>);
    64 ⎨ 66 ─if γ(<bᵢ,b>) < ShrinkBound or b is a forced break then
        ⎪ 68        Remove bᵢ from ActiveNodeList;
        ⎩    ╱─if ShrinkBound ≤ γ(<bᵢ,b>) ≤ StretchBound then
         70         b.fathers := b.fathers ∪ {bᵢ};                         ⎫ 62
            ╱─if b.fathers ≠ 0 then                              74        ⎬
         72   76    b.dist := min{b'.dist + δ(<b',b>)|b' ∈ b.fathers};     ⎪
                ╲─b.bestFathers := those b.fathers that lead to the b.dist;⎭
                   ActiveNodeList := ActiveNodeList@[b];
  if bₘ.fathers = 0 then return no feasible breaks;
 ╱else Go back along bestFathers starting from bₘ until we meet b₀,
 ╲78   all nodes passed by can be used to form the set of optimal breaks.
                            ╱
                        54╱
```

FIG. 10
PRIOR ART

```
/* the graph part with nodes from b₀ to bⱼ is the same as before */
/* the ActiveNodeLists of b₀ to bⱼ are the same as before */

/* compute for the inserted paragraph σᵢ */          ╱─ 80
ActiveNodeList := ActiveNodeList(bⱼ);
for b := b'₁ to b'ₘ· do
92      ForBody(b);
    /* compute for σ3, and first propagate the change brought in due to σ1 */
106 k := min({k'|γ(<bⱼ₊₁,bₖ>) < ShrinkBound}∪{m});
    for b := bⱼ+1 to bₖ do
        ForBody(b);
104 /* compute incrementally for the rest of σ3 */
    last := null;
    OldList := ActiveNodeList(bₖ);
    for b := bₖ₊₁ to bₘ do
        changed := false;
108     for each bᵢ in (ActiveNodeList - OldList) do
            changed := true;
            Compute the adjustment ratio γ(<bᵢ,b>);
            if γ(<bᵢ,b>) < ShrinkBound or b is a forced break then
                Remove bᵢ from ActiveNodeList;
            if ShrinkBound ≤ γ(<bᵢ,b>) ≤ StretchBound then
                b.fathers := b.fathers ∪ {bᵢ};
        for each bᵢ in (OldList - ActiveNodeList) do
            changed := true;
            if bᵢ ∈ b.fathers then
                b.fathers := b.fathers - {bᵢ};
        if b.fathers ≠ 0 then
            OldDist := b.dist;
            b.dist := min{b'.dist + δ̄(<b',b>)|b' ∈ b.fathers};
            if b.dist ≠ OldDist then
                changed := true;
                last := null
            else if last = null then last = b;
                if γ(<last,b>) ≥ ShrinkBound then changed := true;
            b.bestFathers := those b.fathers that lead to the b.dist;
            ActiveNodeList := ActiveNodeList@[b];
    110 OldList := ActiveNodeList(b);
        ActiveNodeList(b) := ActiveNodeList;
        if changed = false then break;

/* The graph part with nodes from the current b to bₘ remains the same */
/* The ActiveNodeLists of b to bₘ remain the same */
if bₘ.fathers = then return no feasible breaks
else Go back along bestFathers starting from bm until we meet b₀,
    all nodes passed by can be used to form the set of optimal breaks.
```

*FIG. 11*

```
/* the graph part with nodes from b_0 to b_{j-1} is the same as before */
/* the ActiveNodeLists of b_0 to b_{j-1} are the same as before */

124 ActiveNodeList := ActiveNodeList(b_{j-1});
    k := min({k'|γ(<b_j'+1,b_k'>) < ShrinkBound} ∪ {m});
    for b := b_j'+1 to b_k' do
126     ForBody(b);
    last := null;
    OldList := ActiveNodeList(b_k);
    for b := b_k+1 to b_m do
    /* same as for insertion from here on */
```

*128*

130 ActiveNodeList := ActiveNodeList($b_j$);
   for b := $b'_1$ to $b'_m$' do
      ForBody(b);
134 FeasibleBreakPointSet := 0;
   for each breakpoint $b_l$ in LeftActiveNodeList($b'_m$') do
      for each breakpoint $b_r$ in RightActiveNodeList($b_{j+1}$) do
         if ShrinkBound ≤ γ(<$b_l$,$b_r$>) ≤ StretchBound then
            FeasibleBreakPointPairSet := FeasibleBreakPointPairSet ∪ {($b_l$,$b_r$)};
138 if FeasibleBreakPointPairSet = 0 then return no feasible breaks
   else ShortestDist := min{$b_l$.leftDist + δ(<$b_l$,$b_r$>) + $b_r$.rightDist|($b_l$,$b_r$) ∈ FeasibleBreakPointPairSet};
      BestBreakPointPairSet := those feasible breakpoint pairs ∈ FeasibleBreakPointPairSet
            that lead to the ShortestDist;
140 Go back along leftBestFathers starting from $b_l$ until we meet $b_0$ and
142 go ahead along rightBestFathers starting from $b_r$ until we meet $b_m$,
   all nodes passed by can be used to form the set of new optimal breaks.

*FIG. 16*

```
ActiveNodeList := ActiveNodeList(b_j);
FeasibleBreakPointSet := 0;
for each breakpoint b_l in LeftActiveNodeList(b_{j-1}) do
    for each breakpoint b_r in RightActiveNodeList(b_{j'+1}) do
        if ShrinkBound ≤ γ(<b_l,b_r>) ≤ StretchBound then
            FeasibleBreakPointPairSet := FeasibleBreakPointPairSet ∪ {(b_l,b_r)};

/* same as for insertion from here on */
```

*FIG. 17*

```
151  ActiveNodeList(b_j) := 0
     k := max({k' | γ(<b_k',b_j>) < ShrinkBound}) ∪ {0}
     for each feasible breakpoint b within <b_k,b_j> do
152      if ShrinkBound ≤ γ(<b,b_j>) ≤ StretchBound then
             154    ActiveNodeList := ActiveNodeList ∪ {b};
     return ActiveNodeList(b_j).                            156
```
$\phantom{x}$ 150

FIG. 18

```
/* the graph part with nodes from b_0 to b_j is the same as before */
ActiveNodeList := retrieve ActiveNodeList(b_j);                    — 158
for b := b'_1 to b'_m' do
        ForBody(b);
k := min({k'|γ(<b_{j+1},b_k'>) < ShrinkBound} ∪ {m});
for b := b_{j+1} to b_k do
        ForBody(b);
last := null;
OldList := retrieve ActiveNodeList(b_k);
for b:= b_{k+1} to b_m do
        changed := false;
        for each b_i in (ActiveNodeList - OldList) do
                changed := true;
                Compute the adjustment ratio γ(<b_i,b>);
                if γ(<b_i,b>) < ShrinkBound or b is a forced break then
                        Remove b_i from ActiveNodeList;
                if ShrinkBound ≤ γ(<b_i,b>) ≤ StretchBound then
                        b.fathers := b.fathers ∪ {b_i};
        for each b_i in (OldList - ActiveNodeList) do
                changed := true;
                if b_i ∈ b.fathers then
                        b.fathers := b.fathers - {b_i};
        if b.fathers ≠ 0 then
                OldDist := b.dist;
                b.dist := min{b'.dist + δ(<b',b>)|b' ∈ b.fathers};
                if b.dist ≠ OldDist then
                        changed := true;
                        last := null
                else if last = null then last = b;
                        if γ(<last,b>) ≥ ShrinkBound then changed := true;
                b.bestFathers := those b.fathers that lead to the b.dist;
                ActiveNodeList := ActiveNodeList@[b];
        OldList := retrieve ActiveNodeList(b);
        if changed = false then break;

/* The graph part with nodes from the current b to b_m remains the same */
if b_m.fathers = 0 then return no feasible breaks
else Go back along bestFathers starting from b_m until we meet b_0,
        all nodes passed by can be used to form the set of optimal breaks.
```

*FIG. 19*

INCREMENTAL ALGORITHMS FOR OPTIMAL LINEBREAKING IN TEXT LAYOUT

This invention relates to document processing systems, and in particular, to computer-implemented methods for updating breakpoints in a paragraph following a change to the paragraph.

BACKGROUND

When we type text into a word processor, we take it for granted that at some point, when the insertion point becomes too close to the right margin, the line will break and any additional text we type will appear on the following line. This typically results in one or more paragraphs, each of which is broken into one or more lines defined by breakpoints marking the beginning and ending of each line. One common problem that arises in word processors and other document processing systems is determining where in the paragraph to place these breakpoints.

Conventional line breaking algorithms, often referred to as "greedy algorithms," seek to pack as much text as possible into a line without having the line exceed the maximum line length. Because of their relative simplicity, these algorithms have the advantage of being easy to implement and quick to execute. They are therefore particularly adapted to real-time editing with conventional interactive word processors, in which prompt response to user input is essential.

A disadvantage of such greedy algorithms, however, is that they optimize only one line at a time. These algorithms are generally incapable of considering how the position of a breakpoint on a particular line may affect the lengths of all other lines in the document (hence the term "greedy"). For example, it may be the case that by placing slightly less text on one line, many other lines can be made to more closely approach the desired line length. A greedy algorithm, because it optimizes only the current line, does not recognize this. As a result, the breakpoints selected by a greedy algorithm can result in paragraphs having a decidedly unattractive appearance, particularly when the paragraphs are to be set in narrow columns. For example, the paragraph may have lines that deviate significantly from the desired line lengths. In some cases, the last line of a paragraph may have only a single word. In the case of justified paragraphs, certain lines may have excessively large gaps between words.

Because of its ability to store the entire paragraph in memory, a computer need not be confined to considering only one line at a time. The presence of the entire paragraph in memory can, in principle, enable the computer to examine the entire paragraph before committing to a particular set of linebreaks.

As a result, the computer should, in principle, be able to consider the effect of a line break on the overall appearance of the paragraph. In some cases, a computer might refrain from packing as many words as possible into a line in order to generate a more aesthetically pleasing paragraph. For example, a short preposition might easily fit on the first line of a paragraph. However, this might result in the last line of the paragraph having only one word.

This ability to consider the entire paragraph at once before committing to any linebreaks gives rise to a second class of algorithms in which breakpoints are selected on the basis of a global parameter that measures the effect of the entire set of breakpoints on the paragraph as a whole. The leading algorithm of this type, which is referred to hereafter as the KP algorithm, is described in Knuth and Plass, "Breaking Paragraphs into Lines," Software-Practice and Experience, 11:1119–1184 (1981), the teachings of which are herein incorporated by reference.

Throughout the specification, it will be necessary to refer to directions and locations within a paragraph. In keeping with the preferred direction for reading and writing English text, a paragraph is considered to begin at its left-most end and to end at its right-most end. The upstream direction is the direction towards the beginning of the paragraph; and the downstream direction is the direction towards the end of the paragraph. The adjectives "earlier" and "later" are used in the specification to refer to the locations that are upstream or downstream from other locations respectively. The method of the invention, however, does not depend on these definitions and can be applied to a paragraph that begins at its rightmost end and ends at its leftmost end.

Referring to FIG. 1, the KP algorithm considers a paragraph 10 to have a set of legal breakpoints 12, each of which has a cost 14 associated with it. Some of these legal breakpoints are "feasible-breakpoints." A feasible breakpoint is a legal breakpoint that results in a line having a length that is within a predefined tolerance of a target line length. From this set of legal breakpoints 12, the KP algorithm selects a first set of feasible breakpoints 16 for the first line, as shown in FIG. 2.

Each feasible breakpoint in this set of feasible breakpoints for the first line generates a set of feasible breakpoints for the second line. For example, if the first line breaks at $b_1$, the second line can break at either $b_3$ or $b_4$. A break earlier than $b_3$ will result in a second line that is too short relative to a desired line length, whereas a break later than $b_4$ will result in a second line that is too long relative to the desired line length. If, on the other hand, the first line breaks at $b_2$ instead of at $b_1$, breaking the second line at $b_3$ results in a second line that is too short. A second line break following $b_4$ results in a second line that is too long. Hence, the only feasible break for the second line is at $b_4$.

It is readily apparent that the above procedure continues until the end of the paragraph, with the feasible breakpoints for any line being determined by the selected feasible breakpoint for the immediately preceding line. Each feasible breakpoint for the first line thus generates a finite set of feasible breakpoint sequences for all subsequent lines. By adding the costs associated with each feasible breakpoint in a sequence of breakpoints, one can obtain a cumulative cost, for each of these feasible breakpoint sequences. The KP algorithm is an efficient way to select the feasible breakpoint sequence having the lowest such cost.

Although the KP algorithm is efficient, it is apparent that if one were to change a paragraph, for example by inserting or deleting text, the algorithm would be forced to regenerate all the feasible breakpoint sequences in the resulting changed paragraph. As a result, application of the KP algorithm to real-time editing, as it is commonly performed in modern word processors, results in undesirable delays caused by the need to re-evaluate all possible breaks in the changed paragraph following each insertion or deletion.

It is thus desirable in the art to provide a globally optimizing linebreaking algorithm that meets the stringent performance standards associated with real-time editing in a modern word processor.

SUMMARY

The method of the invention presupposes that a particular paragraph has been operated upon by a dynamic programming line breaking algorithm such as the KP algorithm described above. As shown in FIGS. 3 and 4, the operation of the KP algorithm generates a network of connecting arcs 18 from one feasible breakpoint 16 to the next, as well as costs associated with each arc. This network of connecting arcs, and their associated costs, will be collectively referred to as "auxiliary information."

Although the ordinary meaning of a "paragraph" is that of a distinct division of a written work, usually marked by beginning on a new and indented line, as used herein, a "paragraph" refers to an ordered sequence of items which is to be divided into an ordered set of subsequences called "lines." Hence, by this definition, an entire book can be considered as a single paragraph. The items themselves need not be alphanumeric characters. For example, the items might be frames in a comic strip or musical symbols in a composition. The method of the invention is sufficiently general to apply to any ordered sequence of items that is to be divided into a similarly ordered set of subsequences of such items.

When a user makes a change to a paragraph, the change can permeate the entire network of arcs. Breakpoints which were once feasible can be rendered unfeasible; previously unfeasible breakpoints can be made feasible; and the cost associated with a path between two feasible breakpoints can change. These changes can, in turn, precipitate the need to make wholesale changes to the distribution of linebreaks throughout the paragraph. Under these circumstances, it may be necessary to run the KP algorithm on the entire paragraph in order to update the auxiliary information and the distribution of linebreaks in the paragraph.

However, in many cases, a change to the paragraph results in highly localized changes to the distribution of linebreaks. For example, the insertion of one or two words to a paragraph can result in linebreaking changes to one or two lines following the insertion point but no changes anywhere else in the paragraph. The insertion or deletion of a punctuation mark may involve no changes at all to the distribution of linebreaks. Under these circumstances, large portions of the auxiliary information previously computed for the paragraph may still be valid and should therefore not have to be recomputed.

The method of the invention takes advantage of the fact that many changes to a paragraph require linebreaking changes only in the immediate neighborhood of the change. To do so, the method of the invention provides for caching auxiliary information that represents the underlying graph structure of a paragraph. This auxiliary information includes information on feasible breakpoints of the original paragraph as well as information concerning costs associated with different paths from one feasible breakpoint to another.

Following a change to the paragraph, the method of the invention identifies a changed section and an unchanged section of the underlying graph associated with the resulting changed paragraph. The method then processes only the changed section, thereby generating changed section information. This changed section information can include a set of changed feasible breakpoints corresponding to the changed section of the paragraph. The method then selects, from the auxiliary information, a selected portion associated with the unchanged section of the paragraph. This selected portion can include a reusable set of feasible breakpoints associated with the unchanged section of the paragraph. From the selected auxiliary information and the set of changed section information, the method obtains the optimal break for the changed paragraph.

By reusing previously obtained auxiliary information concerning the underlying graph structure of the original paragraph, the method of the invention provides an efficient way to incrementally update the linebreaks of a paragraph in a globally optimized manner.

These and other advantages of the invention will be apparent upon examining the following description and the accompanying figures in which:

BRIEF DESCRIPTION OF THE DRAWINGS

FIG. 10 shows pseudo-code for the KP algorithm;

FIG. 11 shows pseudo-code for an incremental version of the KP algorithm for the insertion of an insertion section into a paragraph;

FIG. 16 shows an incremental insertion algorithm in which the feasible breakpoints for an upstream section of a paragraph and the feasible breakpoints for a downstream section of a paragraph are spliced together following an insertion section;

FIG. 17 shows an algorithm similar to that of FIG. 16 but adapted for deletion of a section from a paragraph;

FIG. 18 shows an algorithm for retrieving active node lists from a graph representative of a paragraph; and FIG. 19 shows the algorithm of FIG. 11 but modified to use the algorithm of FIG. 18.

DETAILED DESCRIPTION

Figure 5:
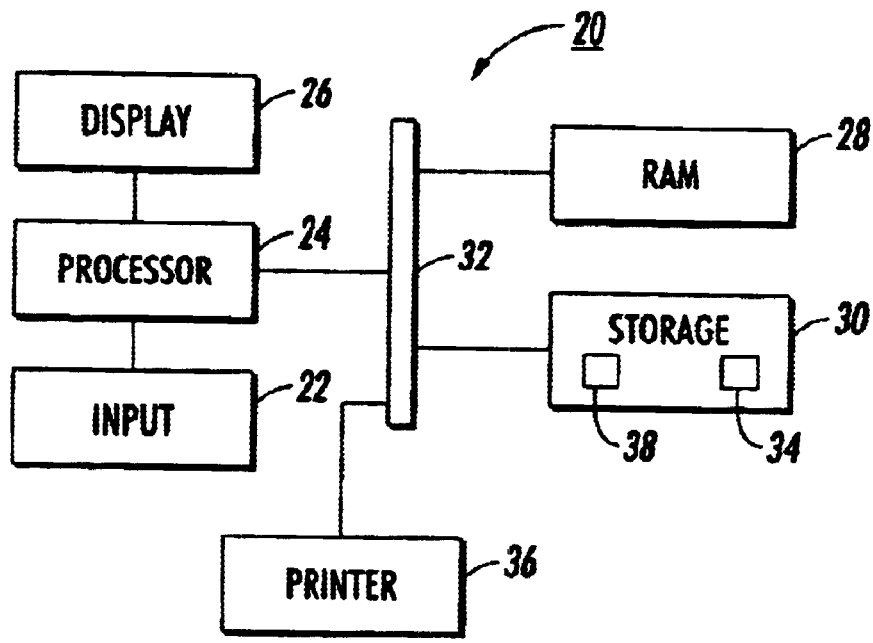
FIG. 5 shows a processing system for implementing the optimal linebreaking algorithms in accordance with the teachings of the present invention.

Referring to FIG. 5, a document processing system 20 embodying the invention includes: one or more input devices 22, typically a keyboard operating in conjunction with a mouse or similar pointing device, for communicating instructions from a user to a main processor 24; and a display monitor 26 for viewing text and graphics displayed by the system 20.

The main processor 24 is adapted to execute programmed instructions for implementing the method of the invention. The document processing system 20 also includes a storage element, such as a random access memory (RAM) 28, for storing programmed instructions to be executed by the main processor 24 and for temporary storage of data representative of a document.

The system 20 further includes other storage devices, such as a non-volatile memory 30, for storage of data representative of a document, and a computer bus 32. The non-volatile memory 30 can be a hard disk local to the document processing system 20. Alternatively, the non-volatile memory 30 can be associated with a server or distributed across several servers, or be incorporated into an enterprise-wide data management system. The computer bus 32 permits communication between the main processor 24, RAM 28, and non-volatile memory 30 to provide for the transfer of data between the document processing system components.

The present invention includes computer software 34, such as a document processor operable on the document processing system 20, for facilitating the layout and typesetting of a document. Such software is typically stored on a computer readable medium such as a magnetic disk or other non-volatile memory 30 and paged into RAM 28 as necessary.

Optionally, the system 20 can include a printer 36 in communication with the bus 32. However, it is also possible for the software 34 to create a device independent file 38 that can be transported to an appropriate printer.

Figure 6:
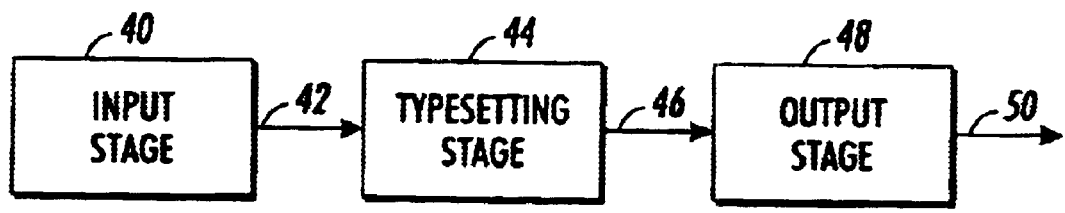
FIG. 6 is a schematic illustration of the system components for practice of the teaching of the present invention in batch mode.

FIG. 6 shows the general workflow associated with the practice of the invention in batch mode. In the input stage 40, a document author creates the content of a document and saves the content as a document file 42 on a disk. The document file 42 is then provided to a typesetting stage 44 which determines the optimal break associated with each paragraph in the document file 42. The typesetting stage 44 then generates a device independent file 46 and sends that file to an output stage 48 that transforms it into a printed document 50.

Figure 7:
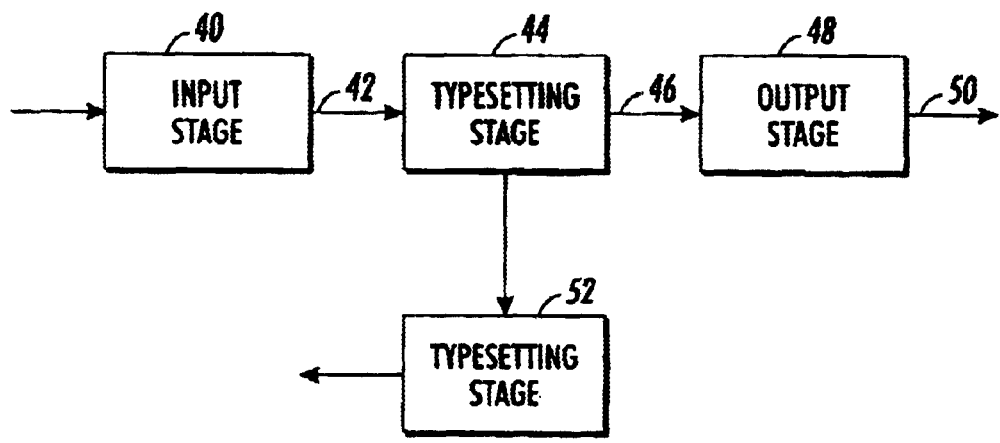
FIG. 7 is a schematic illustration of the system components for practice of the teaching of the present invention in interactive mode.

FIG. 7 shows the workflow of FIG. 6 but adapted for interactive processing rather than batch processing. In FIG. 7, the typesetting stage 44 is in communication with a display stage 52 as well as with the output stage 48. The display stage 52 generates a representation of the document suitable for viewing on the display monitor 26.

The computer software 34 for practice of the invention includes instructions for rapidly and efficiently updating line breaks in a paragraph following a change in the paragraph. Because the software 34 executes instructions that represent an improvement over the KP algorithm, an understanding of the KP algorithm is desirable.

Figure 3:
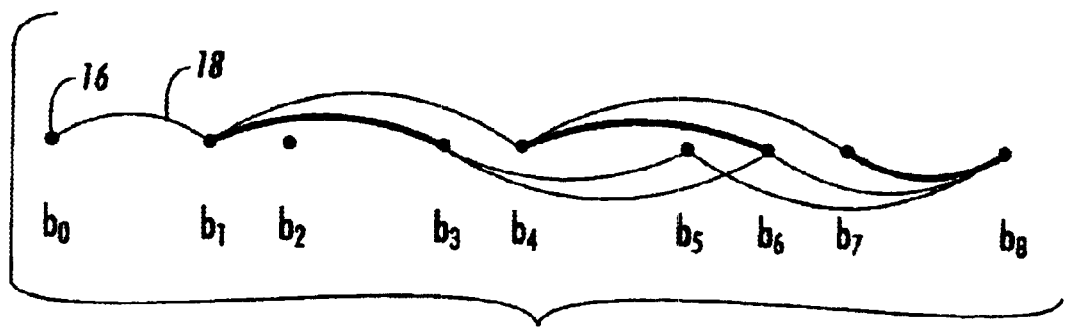
FIG. 3 shows all possible breaks for the paragraph of FIG. 2 that include the first feasible breakpoint.
Figure 4:
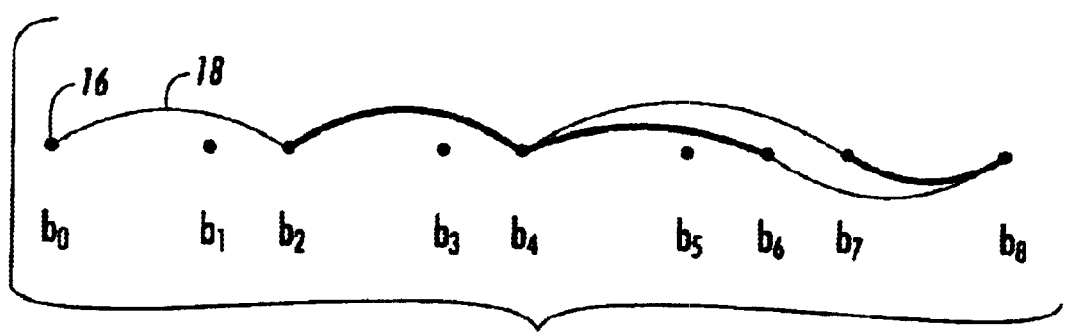
FIG. 4 shows all possible breaks for the paragraph FIG. 2 that include the second feasible breakpoint.

To understand the KP algorithm further, it is useful to consider a paragraph as being an acyclic graph having a node 16 at each feasible breakpoint. A representative graph, shown in FIGS. 3 and 4, has several nodes 16 representing feasible breakpoints $\{b_0 \ldots b_8\}$, with the leftmost node $b_0$ corresponding to the beginning of the paragraph and the rightmost node $b_8$ corresponding to the end of the paragraph. Each node is connected to one or more other nodes by connecting arcs. Each arc connecting two nodes has a cost associated with traversing that arc 18. The uneven thicknesses of the arcs connecting the nodes in FIGS. 3 and 4 are intended to illustrate the relative costs associated with each arc 18. In considering FIGS. 3 and 4, note that these two figures represent the same graph. For the sake of clarity, only the connecting lines emanating from node $b_1$ are shown in FIG. 3. The connecting lines emanating from node $b_2$ are shown separately in FIG. 4.

It is apparent from considering FIGS. 3 and 4 that one can proceed along the connecting arcs 18 from the first node $b_0$ (the beginning of the paragraph) to the last node $b_8$ (the end of the paragraph) along several different paths, each of which is defined by a sequence of connecting arcs. The sequence of nodes encountered along a particular path corresponds to a sequence of linebreaks. Throughout this specification, the term "break" refers to a such a sequence of linebreaks corresponding to a path from a first node $b_0$ to a last node $b_m$ in the acyclic graph representative of a paragraph. Each such break has a cumulative cost defined by the summing the costs of each individual connecting arc 18 in the sequence of connecting arcs. In this model of the paragraph breaking process, the KP algorithm can be viewed as selecting the break that corresponds to the path that has the smallest cumulative cost.

In FIGS. 3 and 4, a first node representing a first breakpoint is connected to a second node representing a second breakpoint if and only if a line break at the first breakpoint can result in a line break at the second breakpoint. Stated differently, given a node in the graph, the set of nodes directly connected to that node by connecting arcs represents a list of active nodes associated with the given node. This list of active nodes is a dynamic list consisting only of those nodes that are approximately one target line length from the given node.

Hence, as shown in FIG. 3, node $b_1$ is connected to nodes $b_3$ and $b_4$ because, as discussed above, line breaks at breakpoints $b_3$ and $b_4$ are permissible following a line break at $b_1$. Similarly, as shown in FIG. 4, node $b_2$ is connected only to node $b_4$ because a line break at breakpoint $b_4$ is the only permissible line break following a line break at $b_2$.

Figure 1:
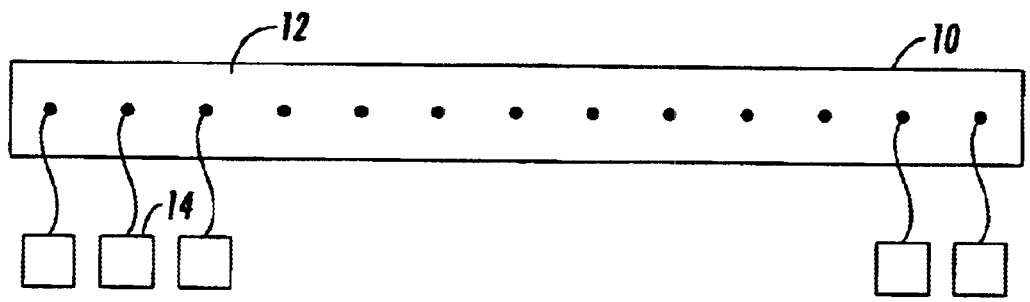
FIG. 1 is an abstract illustration of a paragraph having a plurality of breakpoints.
Figure 2:
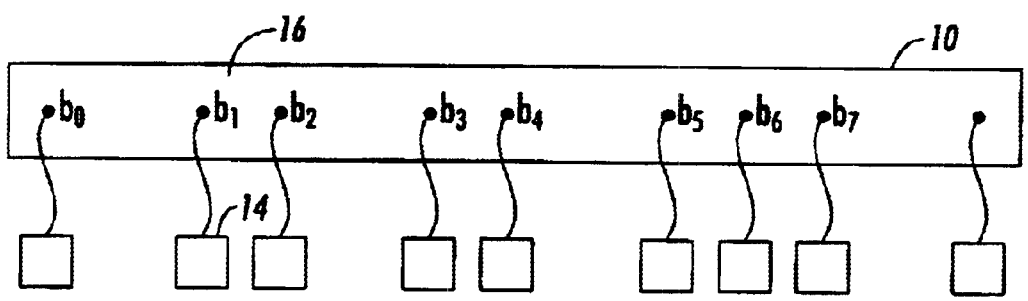
FIG. 2 is an abstract illustration of the paragraph of FIG. 1 with only the feasible breakpoints shown.

As defined above, a break for this paragraph is a sequence of nodes defining a path from $b_0$ to $b_8$ on the graph shown in FIGS. 3 and 4. For example, a line break at $b_1$ results in four possible paths to $b_8$, and hence four possible ways to break the remainder of the paragraph. A line break at $b_2$ results in two possible ways to break the remainder of the paragraph. Hence, there are only six paths, or breaks, through the graph, representing six feasible ways to break the paragraph shown in FIG. 1. Each of these six paths has an associated cumulative cost obtained by summing the costs for each arc along the path. The KP algorithm selects, from these six paths, the path having the lowest cost.

Because the choice of what feasible breakpoint can follow a given breakpoint depends only on the given breakpoint for the preceding line, the problem of selecting the optimal break for a paragraph can be cast as a multi-stage optimization problem in which each line corresponds to one stage. Such problems are ripe for solution by dynamic programming, a recursive technique described in Bellman and Dreyfus, "Applied Dynamic Programming," Princeton Univ. Press (1962), the contents of which are herein incorporated by reference.

Figure 8:
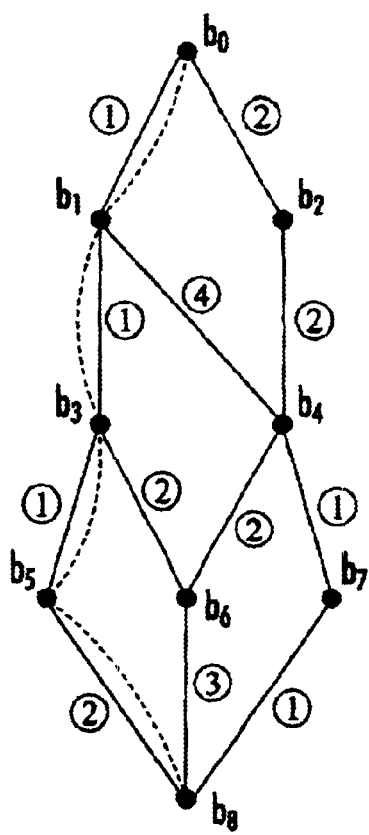
FIG. 8 shows the union of the graphs of FIGS. 3 and 4.

The dynamic programming algorithm can be understood by considering the graph of FIG. 8 formed by recombining the graphs in FIG. 3 and FIG. 4. The circled numbers beside each connecting arc in FIG. 8 represent costs associated with traversing that arc. The KP algorithm seeks a path from the beginning of the paragraph at $b_0$ to the end of the paragraph at $b_8$ that minimizes the sum of these costs. For the case of the graph shown in FIG. 8, that path is shown as the dashed line connecting the nodes $b_0$, $b_1$, $b_3$, and $b_5$.

Figure 9:
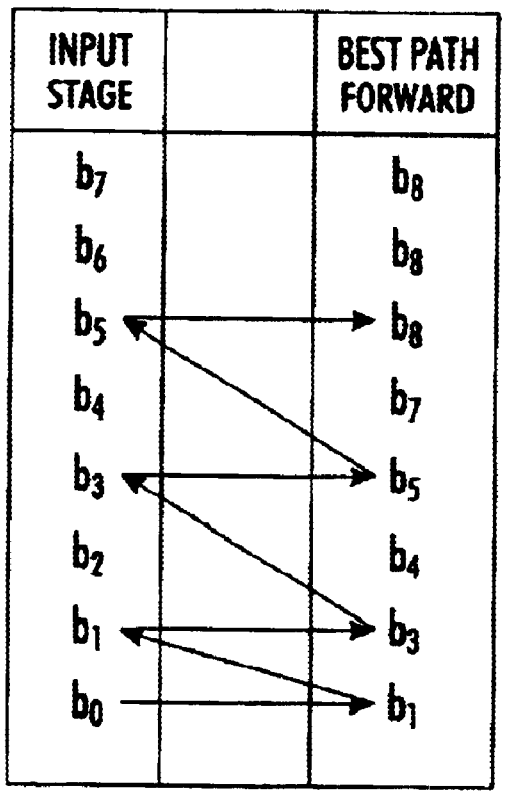
FIG. 9 shows the dynamic programming solution for the optimal break of the paragraph represented by the graph of FIG. 8.

For each node, the dynamic programming algorithm determines the preceding nodes from which one can reach that node and the costs of reaching that node by passing through the preceding nodes. These paths are summarized in FIG. 9. The optimal break for the paragraph represented by the graph of FIGS. 3–8 is thus shown by the line stitching together the two columns of FIG. 9. The cost for this optimal break, together with the costs for all other breaks, is summarized at the bottom of FIG. 9.

FIG. 10 shows, in pseudo-code, the KP algorithm 54 for selecting the optimal sequence of breakpoints. The use of pseudo-code to illustrate algorithms is well known to those of ordinary skill in computer science. Such illustrations are a useful alternative to flowcharts when the algorithm to be described becomes complex or when the algorithm includes recursive steps.

In the algorithm shown in FIG. 10, as well as in subsequently described algorithms:

ActiveNodeList is a list of all nodes in the graph that are candidates for future breaks given a starting point at a particular node;

b.dist is a field associated with node b that indicates the cost of breaking the line at node b;

b.fathers is a list of nodes from which one can reach node b directly from every node in the list. Put differently, (b',b) is an arc of the graph of FIGS. 3 and 4 if, and only if, b' is also a node in b.fathers. $<b_i, b>$ is a line extending between breakpoints $b_i$ and b;

$\gamma(<b_i, b>)$ is a length associated with the line $<b_i, b>$;

ShrinkBound and StretchBound refer to bounds on how much a particular line is permitted to deviate from a target line length;

b.bestFathers is a list of those nodes from b.fathers that result in the lowest cost break up to and including node b;

"@" is an operator that concatenates two lists.

Note that after determining the feasible break points and constructing the graph, the KP algorithm 54 backtracks, beginning at the last breakpoint $b_m$ and proceeding back to the first breakpoint $b_0$. At each step, the algorithm proceeds along a path defined by the nodes in the various bestFathers lists associated with each of the nodes it passes as it moves between $b_m$ and $b_0$. The nodes along this path represent the optimal set of breakpoints, or the optimal break, for the paragraph.

The method of the invention makes extensive use of portions of the KP algorithm 54 illustrated in FIG. 10. This algorithm defines an active node list that represents the active breakpoints for the paragraph (step 56). The algorithm then enters an outer for-loop in which it selects, from the active node list, the feasible breakpoints for a particular choice of breakpoint b in the active node list (step 58). These feasible breakpoints will be stored in b.fathers, which is initialized with the empty set (step 60). The step 62 of executing the body of this outer for-loop, which extends between lines 4–14 inclusive, will be referred to as ForBody (b) in connection with the description of the incremental algorithm of the invention.

To determine the set of possible breakpoints, the KP algorithm 54 enters an inner for-loop in which it considers the line lengths $<b_i, b>$ that would result from breaking the line at each possible breakpoint given that a break has occurred at $b_i$ (step 64). Because, in the general case, interword spacings can be stretched or shrunken within limits to perturb the line length $<b_i, b>$ of a line extending between $b_i$ and b, the algorithm uses a quantity referred to as the "adjustment ratio" that measures the extent to which a line length can be varied (step 66). A suitable definition of an adjustment ratio is given in Knuth and Plass.

If the adjustment ratio indicates that any line between b and $b_i$ would be unacceptably short, the KP algorithm deletes $b_i$ from the active node list (step 68). If the adjustment ratio is such that a line within the acceptable limits can be formed between breakpoints $b_i$ and b, then the KP algorithm adds the breakpoint $b_i$ to the set b.fathers of feasible breakpoints associated with b (step 70). If the adjustment ratio indicates that a line from $b_i$ to b would be unacceptably long, the breakpoint $b_i$ is retained in the active node list. This is because although this breakpoint is not feasible for this choice of b, it may nevertheless be a feasible breakpoint for another choice of b.

Assuming that b.fathers is no longer the empty set following completion of step 64, the next step is to select that break in b.fathers that results in the lowest cumulative cost. This break is determined by a cost-determining conditional statement (step 72). The function $\overline{\delta}(<b',b>)$ in step 74 refers to the cost associated with forming a line between b' and b. The algorithm then keeps track of the nodes that must be traversed to yield this minimum cumulative cost and, in step 76, places them in b.bestFathers. Finally, the algorithm 54 constructs the optimal break using the nodes identified in bestFathers (step 78).

There are two possible changes that can be made to a paragraph: insertion of text at a change point or deletion of text beginning at a change point. Either of these changes results in a change to the underlying graph for the paragraph. However, depending on the nature of the change, most of the underlying graph may remain the same. The incremental algorithms disclosed herein exploit this fact in order to efficiently update the optimal break of a paragraph following a change to that paragraph.

While superficially there may appear to be a difference between a change made to the beginning or the end of a paragraph and a change made in the middle of a paragraph, an examination of the graph in FIG. 8 indicates that this is not the case. Since by definition every paragraph has feasible breakpoints $b_0$ and $b_m$ that mark the beginning and the end of the paragraph, all changes to the paragraph can be considered as changes between these two feasible breakpoints. Hence, throughout this specification, when reference is made to an upstream or downstream section of a paragraph relative to a change point, it is to be understood that these sections can consist of no breakpoints other than the feasible breakpoints $b_0$ and $b_m$ that mark the beginning and end of the paragraph.

Figure 12:
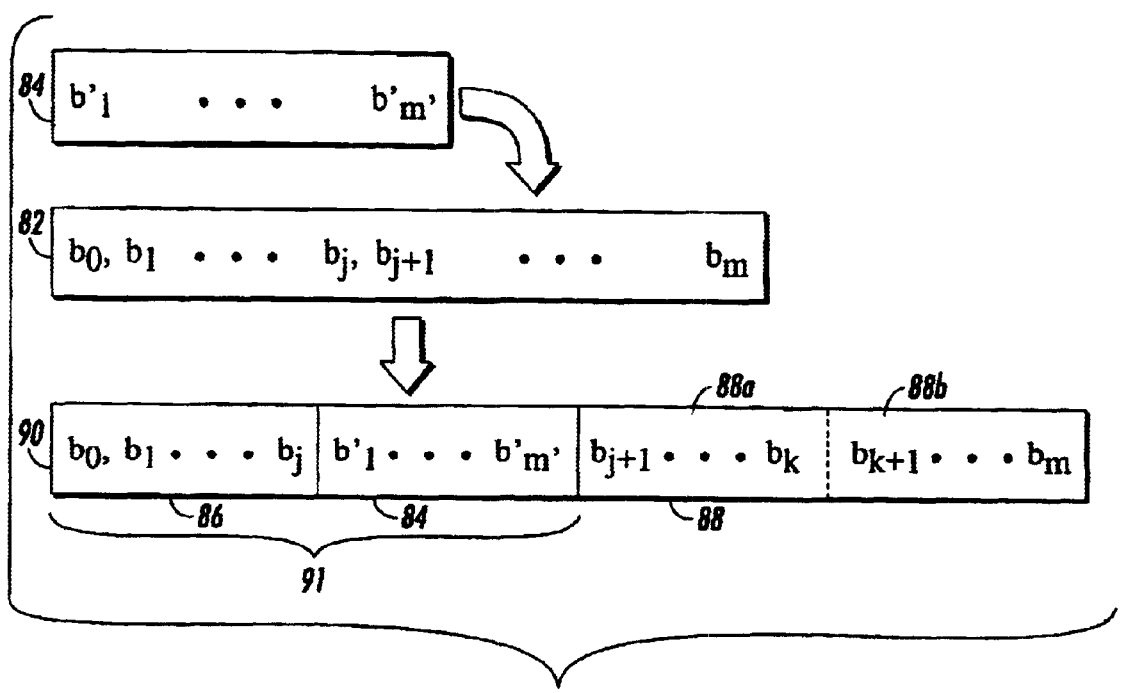
FIG. 12 is an abstract representation of an insertion into a paragraph.

An incremental insertion algorithm 80, shown in FIG. 11, can best be understood by considering an original paragraph 82, as shown in FIG. 12, having feasible breakpoints. $\{b_0, b_1, \ldots b_j, b_{j+1}, \ldots b_m\}$. A section to be inserted 84 (hereafter referred to as the "insertion section") having breakpoints at $\{b'_1, \ldots b'_{m'}\}$ is inserted into the original paragraph 82 so as to divide the original paragraph 82 into an original-paragraph upstream section 86 with feasible breakpoints $\{b_0 \ldots b_j\}$ and an original-paragraph downstream section 88 with feasible breakpoints $\{b_{j+1}, \ldots b_m\}$. The sequence of feasible breakpoints in a changed paragraph 90 thus created is such that $b'_1$ follows $b_j$ and $b'_{m'}$ precedes $b_{j+1}$.

In the resulting changed paragraph 90, the history associated with the original-paragraph upstream section 86 is unchanged and can be reused. Consequently, the KP algorithm 54 need not be reapplied to the upstream section 86. The auxiliary information associated with the insertion section 84 has never been evaluated. Consequently, the KP algorithm 54 is applied to the insertion section 84. Referring now to the incremental insertion algorithm 80 shown in FIG. 11, this is performed, in step 92, by a first for-loop in which ForBody(b) 62 is as indicated in FIG. 10.

Figure 13:
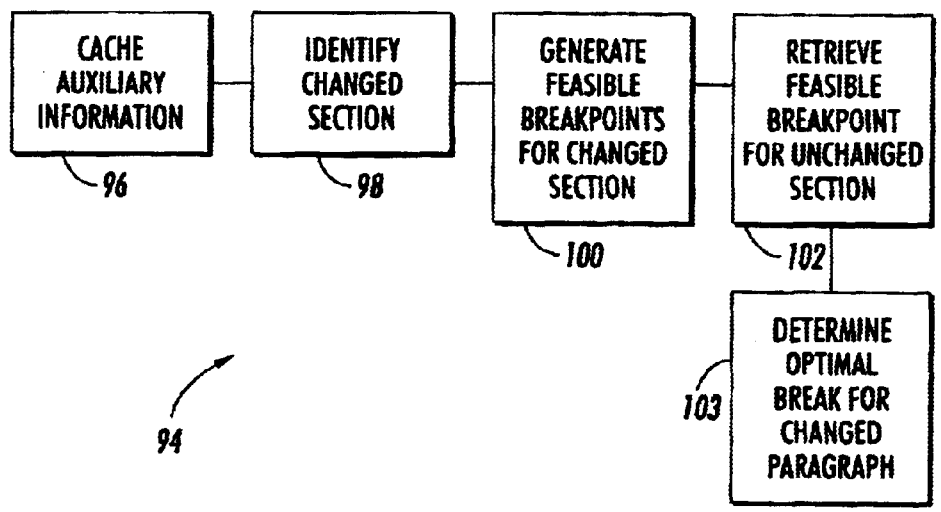
FIG. 13 is a schematic flowchart diagram showing the steps in the incremental algorithms embodying the invention.

The incremental algorithms disclosed herein include steps 94 as shown in FIG. 13. First, auxiliary information associated with the original paragraph is cached (step 96). This is followed by the step of identifying a changed section of the changed paragraph and an unchanged section of the changed paragraph (step 98). In this context, a changed section refers to a section in which the underlying acyclic graph that represents the changed paragraph is changed. The incremental algorithm then generates a set of feasible breakpoints associated with the changed section (step 100) and retrieves, from the cached auxiliary information, a set of feasible breakpoints associated with the unchanged section of the paragraph (step 102). On the basis of these two sets of breakpoints, the incremental algorithm then determines the optimal break for the changed paragraph (step 103).

Referring again to FIG. 12, in a preferred embodiment, the original-paragraph downstream section 88 is further divided into a first section 88a, extending between feasible breakpoints $b_{j+1}$ and $b_k$, in which it is known for certain that the history has changed, and a second section 88b extending between feasible breakpoints $b_{k+1}$ and $b_m$, in which it is not known for certain that there has been a change in the history. Referring back to FIG. 1, a second for-loop then executes the KP algorithm for feasible breakpoints located in this first section 88a (step 104).

The boundary between the first and second sections 88a, 88b of the original-paragraph downstream section 88 is not known a priori and needs to be determined by the incremental insertion algorithm 80. This is performed by proceeding downstream beginning at the feasible breakpoint $b_{j+1}$ immediately following the end of the insertion section 84 and determining the first feasible breakpoint following $b_{j+1}$ for which the adjustment ratio is less than ShrinkBound (step 106). This feasible breakpoint determines the boundary between the first and second sections 88a, 88b.

In step 108, the remaining outer for-loop in the incremental insertion algorithm 80 of FIG. 11 compares the auxiliary information cache for the second section 88b of the original paragraph downstream section 88 with the result of applying the KP algorithm beginning at $b_{k+1}$ and proceeding toward the end of the paragraph at node $b_m$. So long as the active node list from the auxiliary information cache and the active node list being computed in the remaining outer for-loop remain different, the flag changed is set to "true" and execution continues. However, as soon as the active node list from the auxiliary information cache and the active node list being computed in the remaining outer for-loop become the same, the changed flag is set to "false" and the incremental insertion algorithm exits the outer for-loop (step 110). The incremental insertion algorithm 80 then assumes that the active node lists from the current breakpoint onward remain the same as those in the auxiliary information cache.

Figures 14, 15:
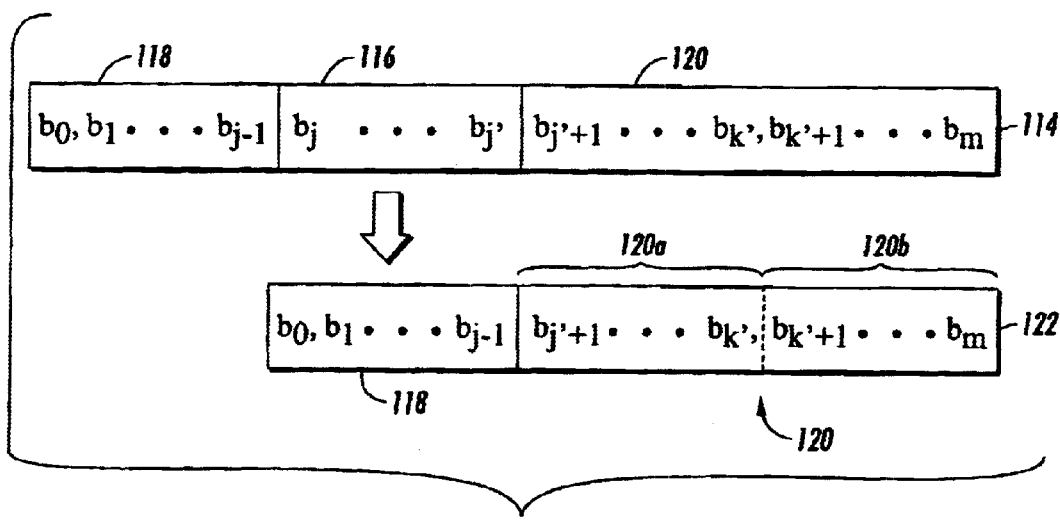
FIG. 14 shows pseudo-code for the incremental algorithm of FIG. 11 but adapted for the deletion of a section from a paragraph.
FIG. 15 is an abstract representation of a paragraph before and after deletion of a section.

The process for deleting a section from a paragraph is similar to that for inserting a section into a paragraph with the exception that there is no need to run the KP algorithm on the section that is deleted. An incremental deletion algorithm 112, which is shown in FIG. 14, can best be understood by considering an original paragraph 114, as shown in FIG. 15, having feasible breakpoints $\{b_0, b_1, \ldots b_{j-1}, b_j, b_{j'}, b_{j'+1} \ldots b_m\}$. A text section 116 marked for deletion (hereafter referred to as a "deletion section") and having feasible breakpoints at $\{b_j \ldots b_{j'}\}$ divides the original paragraph 114 into an original-paragraph upstream section 118 with breakpoints $\{b_0 \ldots b_{j-1},\}$ and an original-paragraph downstream section 120 with breakpoints $\{b_{j'+1}, \ldots b_m\}$. Following deletion of this section, a changed paragraph 122 is formed in which $b_{j-1}$, immediately precedes $b_{j'+1}$.

In the resulting changed paragraph 122, the history associated with the original-paragraph upstream section 118 is unchanged and can be reused. Consequently, the KP algorithm need not be reapplied to the original-paragraph upstream section 118.

In a preferred embodiment, the original-paragraph downstream section 120 is further divided into a first section 120a, extending between feasible breakpoints $b_{j'+1}$ and $b_{k'}$, in which it is known for certain that the history has changed as a result of the deletion, and a second section 120b, extending between feasible breakpoints $b_{k'+1}$ and $b_m$, in which it is not known for certain that there has been a change in the history as a result of the deletion. In a first for-loop, the incremental deletion algorithm then executes the KP algorithm for feasible breakpoints located in this first section 120a (step 126).

As was the case with the incremental insertion algorithm 80, the boundary between the first and second sections 120a, 120b of the original-paragraph downstream section 120 is not known a priori and needs to be determined by the incremental deletion algorithm 112. This is performed by proceeding downstream beginning at the feasible breakpoint $b_{j'+1}$ immediately following the end of the deletion section 116 and determining the first feasible breakpoint following $b_{j'+1}$ for which the adjustment ratio is less than ShrinkBound (step 124). This feasible breakpoint determines the boundary between the first and second sections 120a, 120b of the original-paragraph downstream section 120. The remaining steps in the incremental deletion algorithm 112 of FIG. 14 are identical to those discussed in connection with the incremental insertion algorithm 80.

In another embodiment of the invention, performance can be further enhanced by caching auxiliary information for an upstream section and a downstream section of an original paragraph and splicing these sections together in the vicinity of a change point of the changed paragraph.

In this embodiment, the KP algorithm is also applied to the paragraph beginning at the end of the paragraph and directed toward the beginning of the paragraph. The auxiliary information generated by doing so provides the auxiliary information for the downstream section of the paragraph. This downstream auxiliary information for the downstream section remains the same following a change to the paragraph. Consequently, in this embodiment, the auxiliary information for both upstream and the downstream can be reused to obtain the optimal break following a change to the paragraph. Because both the upstream and the downstream auxiliary information are reused, the time required to determine the optimal break for the changed paragraph is significantly reduced.

This second embodiment of the invention can be understood by considering again the original paragraph 114 shown in FIG. 15, with its upstream section 118 having breakpoints $\{b_0 \ldots b_{j-1}\}$, its downstream section 120 having breakpoints $\{b_{j'+1} \ldots b_m\}$ and its deletion section having breakpoints $\{b_j \ldots b_{j'}\}$. Deletion of the deletion section 116 from the original paragraph 114 creates a changed paragraph 122 made up of the same upstream section 118 and downstream section 120 as the original paragraph 114. In this case, the auxiliary information associated with the upstream section 118 and with the downstream section 120 will remain the same. Put differently, although the breakpoints selected to form the optimal break for the changed paragraph will most likely change, the underlying set of breakpoints, from which this selection is made, remains the same. In terms of the notation introduced above, the breakpoints for $\{(b_0 \ldots b_{j-1}\}$ and for $\{b_{j+1} \ldots b_m\}$ will remain the same.

In selecting the optimal break for the changed paragraph 122, it is useful to recognize that the optimal break must be selected from a set of feasible breaks having the property that there exists a line in the feasible break that is bounded by a feasible breakpoint, $b_1$, from the upstream section 118 and a feasible breakpoint, $b_R$, from the downstream section 120. Hence, in order to select the optimal break, it is first necessary to compile a list of all such lines $<b_L, b_R>$. Having compiled such a list, one can then obtain the set of only those feasible breaks that satisfy this property. The optimal break can then be selected from this set of feasible breaks by backtracking in the manner described in connection with the KP algorithm.

In the case of insertion, the method is similar to that described above with the additional step of augmenting the feasible break set for the upstream section of the changed paragraph with the feasible breaks associated with the inserted section. For example, consider once again the original paragraph 82 shown in FIG. 12, with its upstream section 86 having feasible breakpoints $\{b_0 \ldots b_j\}$ and its downstream section 88 having feasible breakpoints $\{b_{j+1} \ldots b_m\}$. Insertion of the insertion section 84 having feasible breakpoints $\{b'_1 \ldots b'_{m'}\}$ results in the formation of the changed paragraph 90. The insertion section 84 is then used to augment the upstream section 86 so as to form an augmented upstream section 91. Once this augmentation step is performed and the feasible breaks for the augmented section are evaluated, the procedure is identical to that described above in connection with deletion.

FIG. 16 shows an exemplary incremental insertion algorithm 128 that applies the foregoing principle to rapidly update line breaks throughout a changed paragraph 90 following the insertion of an insertion section 84 into an original paragraph 82. The resulting changed paragraph 90, shown in FIG. 12, includes an upstream section 86 for which there exists cached auxiliary information obtained from applying a dynamic programming algorithm to the original paragraph 82, and a downstream section 88 for which there exists auxiliary information obtained in the same manner. The incremental insertion algorithm 128 described below uses the cached auxiliary information for the upstream section 86 and the downstream section 88 of the original paragraph 82 to efficiently obtain the optimal break for the changed paragraph 90.

The incremental insertion algorithm 128 shown in FIG. 16 begins with the application of the KP algorithm to the insertion section (step 130). This results in the generation of auxiliary information for the insertion section and the formation of an augmented upstream section 91 as shown in FIG. 12. A pair of nested for-loops then obtains (step 134) pairs of feasible breakpoints $\{b_L, b_R\}$ that result in permissible line breaks and that satisfy the following properties:

$b_L$ is the last breakpoint in the upstream section, and $b_R$ is the first breakpoint in the downstream section.

The resulting feasible breakpoint pairs $\{b_L, b_R\}$ are collected in a set denoted as FeasibleBreakPointPairSet (step 136).

The incremental insertion algorithm 128 then identifies a path from the beginning of the paragraph to the end of the paragraph that has the lowest cumulative cost and that also includes a feasible breakpoint pair from FeasibleBreakPointPairSet (step 138). The algorithm 128 then identifies the feasible breakpoint pair that lies on this path and that has the lowest cumulative cost (step 140).

Finally, the incremental insertion algorithm 128 backtracks along the cached auxiliary information for the upstream section 86, the auxiliary information for the insertion section 84, and the cached auxiliary information for the downstream section 88 to select the optimal break for the changed paragraph 90 (step 142).

The same principles used in implementing the incremental insertion algorithm 128 of FIG. 16 can be applied to an incremental deletion algorithm 144 as shown in FIG. 17. The incremental deletion algorithm 144 of FIG. 17 is essentially identical to the incremental insertion algorithm of FIG. 16 with the exception that it lacks a step corresponding to the step 130, shown in FIG. 16, of applying the KP algorithm to an insertion section 84.

In the incremental deletion algorithm 144 of FIG. 17, a pair of nested for-loops obtains (step 146) pairs of feasible breakpoints $\{b_L, b_R\}$ that result in permissible line breaks and that satisfy the following properties:

$b_L$ is the last breakpoint in the upstream section, and $b_R$ is the first breakpoint in the downstream section.

The resulting feasible breakpoint pairs $\{b_L, b_R\}$ are collected in a list denoted as FeasibleBreakPointPairSet (step 148). Following step 148, the incremental deletion algorithm 144 is identical to the incremental insertion algorithm of FIG. 16.

In the incremental algorithms presented thus far, the active node list for every breakpoint forms part of the cached auxiliary information. However, since the active node list can always be reconstructed from the underlying graph, it is not necessary to save the active node lists for each breakpoint in this manner. All that is necessary is to cache the underlying graph and to provide a routine for retrieving the active node list from the underlying graph. A retrieval routine 150 for performing this task is shown in FIG. 18.

The retrieval routine 150 of FIG. 18 first identifies the first breakpoint that results in a line of sufficient length (step 151). Beginning with that breakpoint, the retrieval routine 150 enters a for-loop in which it considers all subsequent breakpoints (step 152). For each subsequent breakpoint, the retrieval routine 150 determines whether a line that breaks at that breakpoint can have a length that is within a threshold from a desired line length (step 154). If the subsequent breakpoint can result in such a line, then that breakpoint is added to the active node list (step 156).

It will be clear to one of ordinary skill in the art that the retrieval routine 150 can readily be incorporated into the incremental algorithm presented thus far. As an example, FIG. 19 shows an incremental insertion algorithm 158 that is identical to that shown in FIG. 11 with the exception that the retrieval algorithm is used to reconstruct the active node lists wherever necessary (steps 160, 162, 164). Similar modifications can readily be made to the incremental algorithms shown in FIGS. 14, 16, and 17.

Having described the invention and a preferred embodiment thereof, what is claimed as new and secured by Letters Patent is:

1. A computer-implemented method for incrementally evaluating an optimal break for a changed paragraph formed by making a change at a first change point of an original paragraph, said method comprising the steps of:

generating auxiliary information for said original paragraph, including original paragraph feasible breakpoints;

identifying a changed section of said changed paragraph and an unchanged section of said changed paragraph;

processing said changed section, thereby generating changed section information, including changed section feasible breakpoints;

selecting, from said auxiliary information, selected auxiliary information corresponding to said unchanged section of said changed paragraph; and determining said optimal break on the basis of said changed section information and said selected auxiliary information.

2. The method of claim 1, wherein said selecting step comprises the step of obtaining a reusable set of feasible breakpoints corresponding to said unchanged section of said changed paragraph.

3. The method of claim 1, wherein said step of identifying said changed section comprises the step of detecting a difference between said changed section information and said auxiliary information.

4. The method of claim 1, wherein said step of generating said auxiliary information comprises the step of caching said original feasible breakpoints and a set of links between said original feasible breakpoints.

5. The method of claim 5, wherein said step of generating said auxiliary information further comprises the step of caching a corresponding cost for each of said links.

6. The method of claim 1, wherein said step of processing said changed section comprises the step of applying a dynamic programming algorithm to said changed section.

7. The method of claim 6, further comprising the step of selecting said dynamic programming algorithm to be the KP algorithm.

8. The method of claim 6, wherein said step of processing said changed section further comprises the step of identifying a set of feasible breakpoints for a downstream section following said insertion section.

9. The method of claim 1, wherein said change is an insertion of an insertion section into said original paragraph and said step of processing said changed section further comprises the step of identifying a set of feasible breakpoints for said insertion section.

10. The method of claim 9, wherein said step of identifying said set of feasible breakpoints comprises the step of applying a dynamic programming algorithm to said insertion section.

11. The method of claim 10, wherein said step of applying a dynamic programming algorithm comprises the step of applying the KP algorithm to said insertion section.

12. The method of claim 1, wherein said step of identifying said changed section comprises the step of detecting a difference between said selected auxiliary information and said changed section information and said step of processing said changed section comprises the step of applying a dynamic programming algorithm to said changed section.

13. The method of claim 12, wherein said step of applying a dynamic programming algorithm to said changed section information comprises the step of selecting said dynamic programming algorithm to be the KP algorithm.

14. The method of claim 1, wherein said step of determining said optimal break comprises the step of applying a dynamic programming algorithm to said changed section information and said selected auxiliary information.

15. The method of claim 1, wherein said changed paragraph has a startpoint, an endpoint, an upstream section extending from said startpoint to said first change point, and a downstream section extending from said first change point to said end point, and said processing step comprises the step of forming a set of all breaks having a path extending from a feasible breakpoint in said upstream section to a feasible breakpoint in said downstream section.

16. The method of claim 15, further comprising the step of determining a cumulative cost for each of said breaks and said step of determining said optimal break comprises the step of selecting from said set of all breaks a break having the lowest cumulative cost.

17. The method of claim 1, wherein the changed paragraph further includes:

a startpoint, an endpoint, a second change point, an upstream section extending from the startpoint to the first change point, and a downstream section extending from the second change point to the endpoint; and the step of generating auxiliary information further includes:

determining a cumulative cost for each of the original feasible breakpoints having a path extending from the startpoint to the endpoint, and selecting from the original feasible breakpoints a set of breaks forming an original optimal path, the original optimal path having the lowest cumulative cost.

18. The method of claim 17, wherein:

the step of processing the changed section includes determining a cumulative cost for each of the changed section feasible breakpoints lying on a path extending from the first change point to the second change point; and the step of determining the optimal break includes selecting from the changed section feasible breakpoints a set of breaks forming a changed section optimal path, the changed section optimal path having the lowest cumulative cost.

19. The method of claim 18, further including:

selecting a pair of feasible breakpoints ($b_L$, $b_R$) lying on the original optimal path, wherein $b_L$ is a last breakpoint lying on a path extending from the startpoint to the first change point and $b_R$ is a first breakpoint lying on a path extending from the second change point to the endpoint.

20. The method of claim 19, wherein the step of determining the optimal break further includes:

selecting a set of breaks having the lowest cumulative cost on a path extending from the feasible breakpoint $b_L$ to the startpoint; and selecting a set of breaks having the lowest cumulative cost on a path extending from the feasible breakpoint $b_R$ to the endpoint.

21. The method of claim 17, further including:

incrementally determining feasible breakpoints for the downstream section;

comparing the downstream section feasible breakpoints with the selected auxiliary information; and in response to detecting a difference between the downstream section feasible breakpoints and the selected auxiliary information, setting up a splitting point, thereby splitting the downstream section into a first downstream section and a second downstream section.

22. The method of claim 21, further including:

determining a cumulative cost for each of the first downstream section feasible breakpoints having a path extending from the second change point to the splitting point; and selecting from the first downstream section feasible breakpoints a set of breaks forming a first downstream section optimal path, the first downstream section optimal path having the lowest cumulative cost.

23. The method of claim 21, further including:
incrementally processing the second downstream section, thereby identifying feasible breakpoints lying on a path extending from the splitting point to the endpoint and selecting from the identified feasible breakpoints optimal breaks which generate the lowest cumulative cost on a path extending from the splitting point to a currently processed point;
comparing the selected second downstream section optimal breaks with the breaks lying on the original optimal path; and
in response to detecting a difference between the selected second downstream section optimal breaks and the original optimal path breaks, updating the original optimal path, the updated optimal path having the lowest cumulative cost.

24. A computer-readable medium having encoded thereon software for incrementally evaluating an optimal break for a changed paragraph formed by making a change at a change point of an original paragraph, said software comprising instructions for executing the steps of:
generating auxiliary information for said original paragraph;
identifying a changed section of said changed paragraph and unchanged upstream and downstream sections of said changed paragraph;
processing said changed section, thereby generating changed section information;
selecting, from said auxiliary information, selected auxiliary information corresponding to said unchanged sections of said changed paragraph;
generating dynamic information for the unchanged downstream section while comparing the generated dynamic information with the selected auxiliary information to detect a difference between the dynamic information and the auxiliary information and create an updated information for the unchanged downstream section; and
determining said optimal break on the basis of said updated information for said unchanged downstream section, said changed section information and said selected auxiliary information for said upstream section.

25. The computer-readable medium of claim 24, wherein said instructions for executing said processing step further comprise instructions for selecting said changed section information to be a changed set of feasible breakpoints corresponding to said changed section of said changed paragraph.

26. The computer-readable medium of claim 24, wherein said selecting step comprises the step of obtaining a reusable set of feasible breakpoints corresponding to said unchanged section of said changed paragraph.

27. The computer-readable medium of claim 24, wherein said instructions for identifying said changed section comprise instructions for executing the step of detecting a difference between said changed section information and said auxiliary information.

28. The computer-readable medium of claim 24, wherein said instructions for generating said auxiliary information comprise instructions for executing the step of caching a set of reusable feasible breakpoints and a set of links between said reusable feasible breakpoints.

29. The computer-readable medium of claim 28, wherein said instructions for generating said auxiliary information further comprise instructions for executing the step of caching a corresponding cost for each of said links.

30. The computer-readable medium of claim 24, wherein said instructions for processing said changed section comprise instructions for executing the step of applying a dynamic programming algorithm to said changed section.

31. The computer-readable medium of claim 30, wherein said instructions further comprise instructions for executing the step of selecting said dynamic programming algorithm to be the KP algorithm.

32. The computer-readable medium of claim 30, wherein said instructions for executing the step of processing said changed section further comprise instructions for executing the step of identifying a set of feasible breakpoints for a downstream section following said insertion section.

33. The computer-readable medium of claim 24, wherein said change is an insertion of an insertion section into said original paragraph and said instructions for executing the step of processing said changed section comprise instructions for executing the step of identifying a set of feasible breakpoints for said insertion section.

34. The computer-readable medium of claim 33, wherein said instructions for executing the step of identifying said set of feasible breakpoints comprise instructions for executing the step of applying a dynamic programming algorithm to said insertion section.

35. The computer-readable medium of claim 34, wherein said instructions for executing the step of applying a dynamic programming algorithm comprise instructions for executing the step of applying the KP algorithm to said insertion section.

36. The computer-readable medium of claim 24, wherein said instructions for executing the step of identifying said changed section comprise instructions for executing the step of detecting a difference between said selected auxiliary information and said changed section information and said instructions for executing the step of processing said changed section comprise instructions for executing the step of applying a dynamic programming algorithm to said changed section.

37. The computer-readable medium of claim 35, wherein said instruction for executing the step of applying a dynamic programming algorithm to said changed section information comprise instructions for executing the step of selecting said dynamic programming algorithm to be the KP algorithm.

38. The computer-readable medium of claim 24, wherein said instruction for executing the step of determining said optimal break comprise instructions for executing the step of applying a dynamic programming algorithm to said changed section information and said selected auxiliary information.

39. The computer-readable medium of claim 24, wherein said changed paragraph has a startpoint, an endpoint, said upstream section extends from said start point to said change point, and said downstream section extends from said change point to said end point, and said instructions for executing the processing step comprise instructions for executing the step of forming a set of all breaks having a path extending from a feasible breakpoint in said upstream section to a feasible breakpoint in said downstream section.

40. The computer-readable medium of claim 39, wherein said software further comprises instruction for executing the step of determining a cumulative cost for each of said breaks and said instructions for executing the step of determining said optimal break comprise instructions for executing the step of selecting, from said set of all breaks, a break having the lowest cumulative cost.

41. A data processing system for incrementally evaluating an optimal break for a changed paragraph formed by making a change at a change point of an original paragraph, wherein the change creates an unchanged upstream section and a downstream section including a changed section and an unchanged section, said system comprising:

means for generating auxiliary information for said original paragraph to create a set of reusable feasible breakpoints;

means for processing said changed section, thereby generating changed section information, including changed section feasible breakpoints;

means for selecting, from said auxiliary information, selected auxiliary information corresponding to said unchanged upstream and downstream sections of said changed paragraph;

means for identifying the changed and unchanged downstream sections by detecting a difference between the changed section feasible breakpoints and the unchanged downstream section feasible breakpoints; and means for determining said optimal break on the basis of said changed section information and said selected auxiliary information.

42. The data processing system of claim 41, wherein said means for generating said auxiliary information comprises first memory means for caching a said set of reusable feasible breakpoints and a set of links between said reusable feasible breakpoints.

43. The data processing system of claim 42, wherein said means for generating said auxiliary information further comprises second memory means for the step of caching a corresponding cost for each of said links.

44. The data processing system of claim 41, wherein said means for processing said changed section comprises dynamic programming means for operating on said changed section.

45. The data processing system of claim 44, wherein said dynamic programming means comprises means for executing the KP algorithm.

46. The data processing system of claim 41, wherein said change is an insertion of an insertion section into said original paragraph.

47. The data processing system of claim 46, wherein said step of identifying said set of feasible breakpoints comprises dynamic programming means f or operating on said insertion section.

48. The data processing system of claim 47, wherein said dynamic programming algorithm comprise s mean s for executing the KP algorithm.

49. The data processing system of claim 41, wherein said means for determining said optimal break comprises the means for applying a dynamic programming algorithm to said changed section information and said selected auxiliary information.

50. The data processing system of claim 41, wherein said changed paragraph has a startpoint, an endpoint, said upstream section extends from said start point to said change point, and said downstream section extends from said change point to said end point, and said means for processing comprises means for forming a set of all breaks having a path extending from a feasible breakpoint in said upstream section to a feasible breakpoint in said downstream section.

51. The data processing system of claim 50, further comprising means for determining a cumulative cost for each of said breaks and said means for determining said optimal break comprises means for selecting from said set of all breaks a break having the lowest cumulative cost.

* * * * *